(No Model.) 3 Sheets—Sheet 1.

G. L. MERRILL.
MACHINE FOR CUTTING GREEN CORN FROM THE COB.

No. 385,871. Patented July 10, 1888.

WITNESSES:
C. Bendixon
H. P. Denison

INVENTOR,
G. Lewis Merrill.
BY
Hull, Laass & Hull
ATTORNEYS.

(No Model.) 3 Sheets—Sheet 2.
G. L. MERRILL.
MACHINE FOR CUTTING GREEN CORN FROM THE COB.
No. 385,871. Patented July 10, 1888.
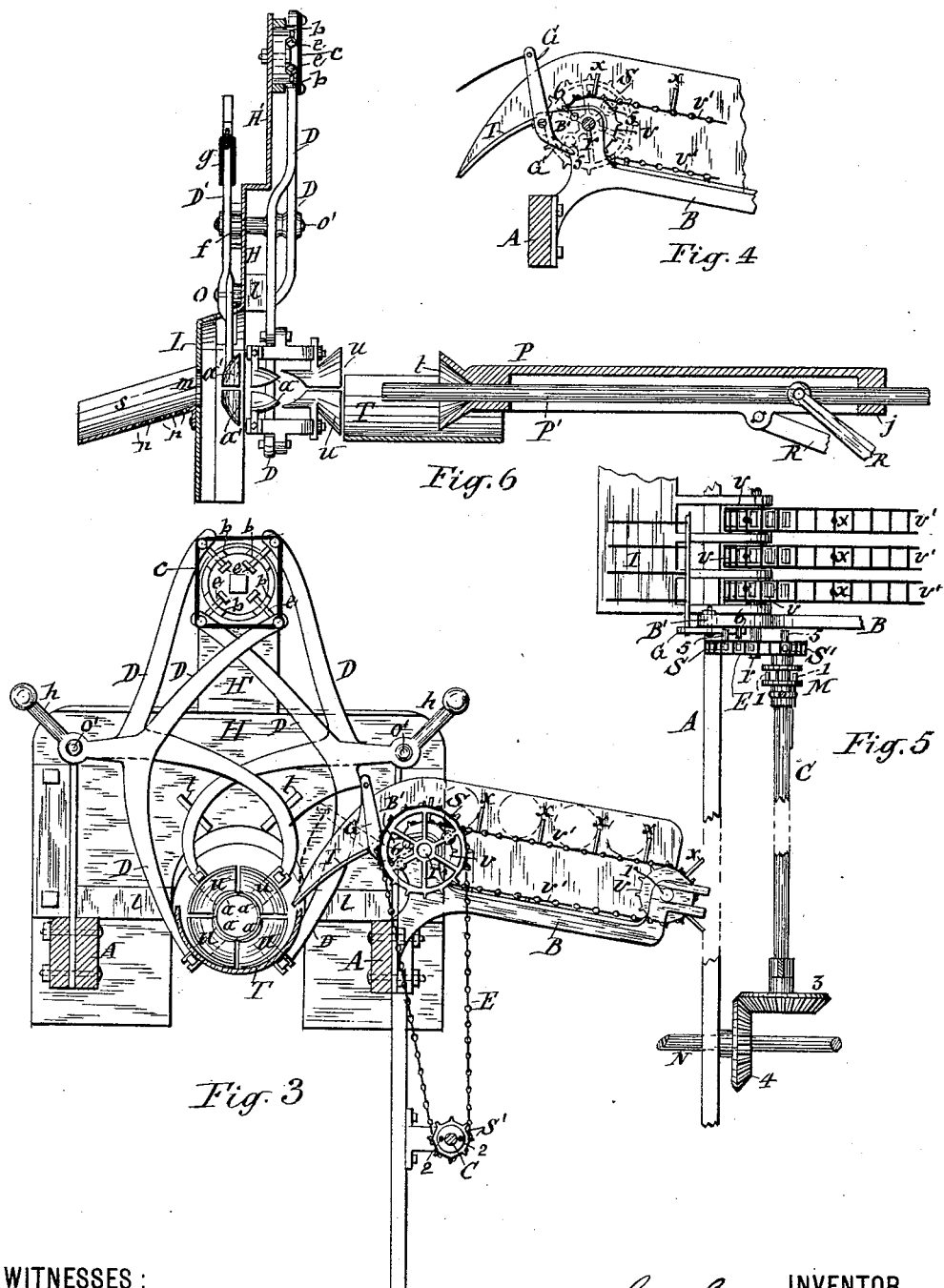
WITNESSES:
C. Bendixon
H. P. Dennison.
INVENTOR.
G. Lewis Merrill,
BY
Duell, Laass & Duell
ATTORNEYS.

(No Model.) 3 Sheets—Sheet 3.
G. L. MERRILL.
MACHINE FOR CUTTING GREEN CORN FROM THE COB.
No. 385,871. Patented July 10, 1888.
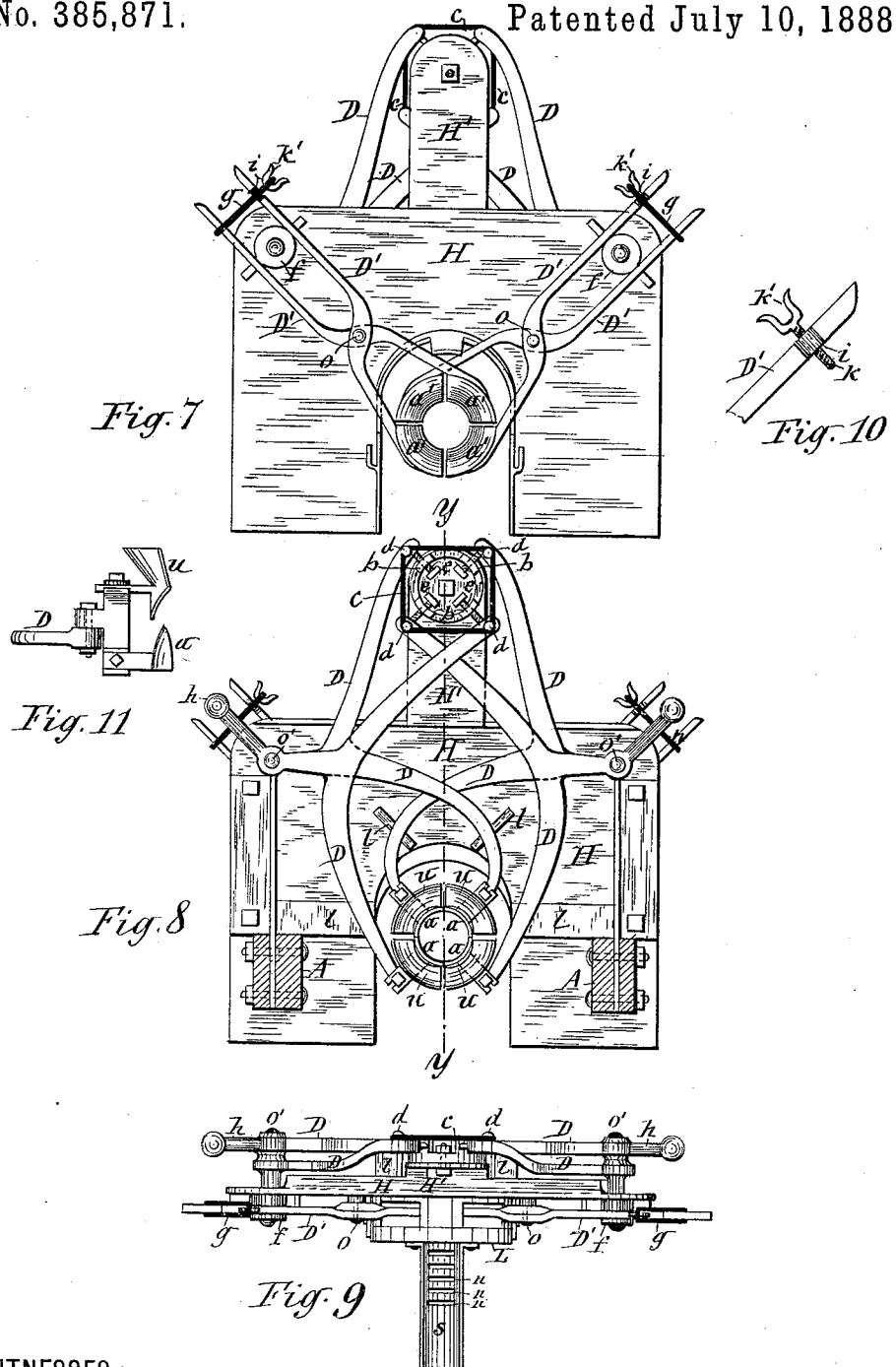
WITNESSES:
C. Bendixon
H. P. Denison
INVENTOR
G. Lewis Merrill
BY
Duell, Laass & Duell
ATTORNEYS.

UNITED STATES PATENT OFFICE.

G. LEWIS MERRILL, OF SYRACUSE, NEW YORK.

MACHINE FOR CUTTING GREEN CORN FROM THE COB.

SPECIFICATION forming part of Letters Patent No. 385,871, dated July 10, 1888.

Application filed May 16, 1887. Serial No. 238,324. (No model.)

*To all whom it may concern:*

Be it known that I, G. LEWIS MERRILL, of Syracuse, in the county of Onondaga, in the State of New York, have invented new and useful Improvements in Machines for Cutting Green Corn from the Cob, of which the following, taken in connection with the accompanying drawings, is a full, clear, and exact description.

This invention relates to the class of machines which force the ears of green corn longitudinally between yieldingly-sustained cutters and scrapers adapted to remove the kernels from the cob; and the invention consists in an improved construction and combination of the constituent parts of the machine, all as hereinafter described, and specifically set forth in the claims.

Figure 1:
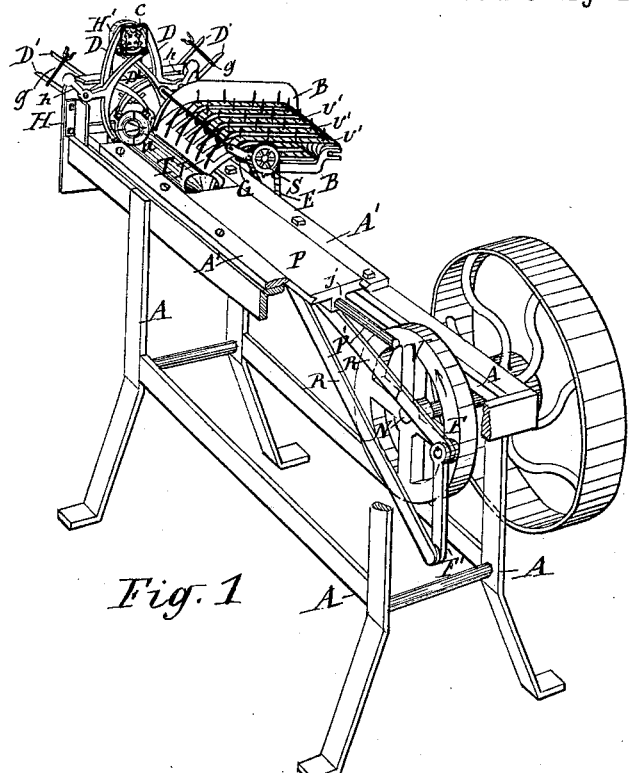
Figure 2:
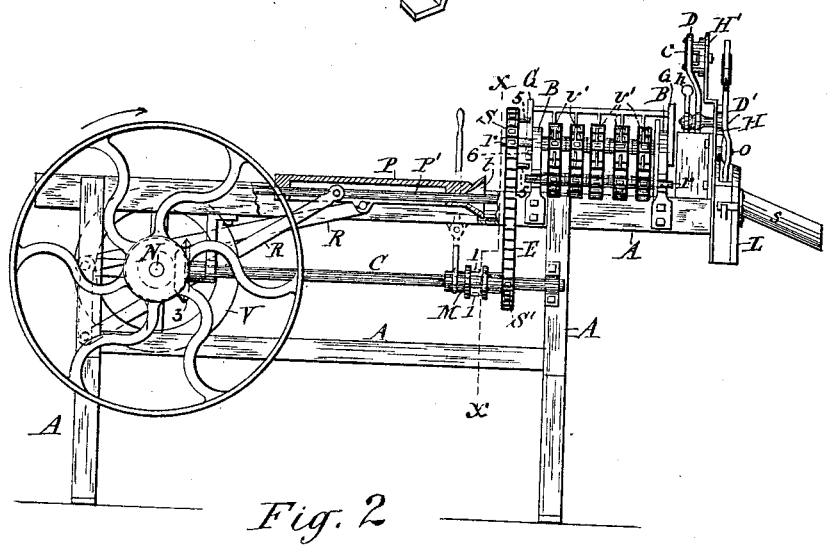

In the annexed drawings, Figure 1 is a perspective view of the machine embodying my invention. Fig. 2 is a side elevation of the same, portions of the frame being broken away in both the said figures to better illustrate the arrangement of the plungers and their actuating-cranks. Fig. 3 is an enlarged vertical transverse section on line $x\, x$, Fig. 2. Fig. 4 is a detail view showing more clearly the operation of the gate of the feed mechanism. Fig. 5 is a top plan view of the same. Fig. 6 is a vertical longitudinal section taken in a plane following the outline of one pair of cutter-carrying arms. Figs. 7 and 8 are respectively front and rear elevations of the head on which the corn cutting and scraping implements are pivoted. Fig. 9 is a top plan view of the same. Fig. 10 is a detail view of the device for adjusting the tension of the spring connected with the scraper-arms, and Fig. 11 is an end view of one of the supporting-arms which carry the cutters and gages.

Similar letters of reference indicate corresponding parts.

A represents the main supporting-frame of the machine, which frame is formed with horizontal guide-rails A' A' and with a stationary head, H, which rises from the forward end of the frame and stands at right angles to the guide-rails A' A'.

On each side of the head H are pivoted two sets of arms, D D and D' D', each set being composed of four arms arranged in pairs, and with their inner ends around a common center and those of each pair disposed diametrically opposite each other. To the said ends of the arms D D, on the rear side of the head, are connected the cutters $a\, a$, with gages $u\, u$, as illustrated more clearly in Fig. 11 of the drawings, and to the inner ends of the arms D' D', at the front side of the head H, are attached the scrapers $a'\, a'$, which are of the ordinary and well-known form. All of said arms extend upward from the respective cutters and scrapers, and are pivoted to the upper part of the head H, as shown at $o\, o$ and $o'\, o'$ in Figs. 7 and 8 of the drawings. Said arms are thus arranged completely out of the way of the delivery of the corn and cobs from the machine, so as to effectually prevent the corn and moisture from coming in contact with the arms.

The cutter-carrying arms D D of each pair cross each other, and are extended upward from their pivots and terminate at points around a common center, and between the said ends of the arms and center are arranged lugs $b\, b$, secured to a vertical extension, H', of the head H. Said lugs are provided with screw-threaded eyes, in which work set-screws $e\, e$, against the outer ends of which the upper ends of the arms are normally held by a spring, $c$, preferably of the form of an endless rubber band extending around the exterior of the lugs $d\, d$, secured to the ends of the arms D D.

By turning the set-screws $e\, e$ so as to project greater or less distances from the lugs the arms D D are so adjusted in their normal position as to carry the cutters $a\, a$ at a minimum distance from a common center and equidistant apart. The arms D D, which carry the lower cutters, I provide with handles $h\, h$, by which I am enabled to swing the said arms so as to liberate the corn from between the cutters when necessary.

It will be observed that in my improved machine the four cutter-carrying arms D D D D have no positive connection with each other and operate independently of each other, and yet are forced with equal pressure toward their operative position by one and the same spring.

The scraper-arms D' D' of each pair cross each other at their pivot, and their outer ends are held normally against opposite sides of a boss, $f$, on the head H by a spring or elastic band, $g$, extended around the outer ends of said arms, and in order to permit of adjusting the tension of the said spring I provide one of the arms with a screw-threaded eye, $i$, in which is inserted a screw, $k$, formed with a bifurcated head, $k'$, through which head the elastic band $g$ passes.

To properly support the inner ends of the cutter-carrying arms D D, I secure to the head H guides or bearings $l\ l$, on which the said arms slide during their oscillatory movement.

To the head H, I detachably connect a cap, L, which is closed at its top and sides, so as to effectually house the scrapers, and is open at its bottom to form a chute for conducting downward from the machine the substances cut and scraped from the cob. Said cap is provided with a port, $m$, in range with the feed-trough, hereinafter described, and below the said port is a spout, $s$, projecting from the cap, to conduct the cobs from the machine. This spout I provide with transverse slots $n\ n$, for the purpose of separating as much as possible the moisture from the cob.

In front of the cutters $a\ a$ and gages $u\ u$ is arranged a feed-trough, T, parallel with the guide-rails A' A', heretofore described. Upon said guide-rails is arranged to slide longitudinally the primary plunger P, which is formed with a conical recess, $t$, in the end facing the head H, as best seen in Fig. 6 of the drawings. The end of the ear of corn placed in the trough T enters the recess $t$ of the plunger, and thereby becomes axially centered on said plunger.

Longitudinally within the plunger P slides the supplemental plunger P', which is parallel therewith, and is guided at one end in a channel extending longitudinally through the center of the aforesaid conically-recessed end of the plunger P. The opposite end of the supplemental plunger is guided in an eye formed in a lug, $j$, projecting from the plunger P. Said two plungers are actuated at different speeds and with strokes of different lengths by means of pitmen R R, connecting said plungers with cranks F F', which are arranged at different angles and different distances from a common axis or from one and the same shaft, N, as shown in Figs. 1 and 2 of the drawings, the primary plunger P being connected with the crank F, which is nearest the axis of the shaft N, and the supplemental plunger P' being connected with the crank F', which is farthest from the axis and in the rear of the crank F.

In order to obviate torsional strain on the connection of the pitman with the plungers, and at the same time render the machine more compact, I arrange the shaft N at the rear end of the machine, where I am enabled to secure to the said shaft the wheel V inside of the frame A, to which wheel I affix the wrist-pin, which constitutes the crank F, the bearing of which is in line with the primary plunger P, and to the end of said crank I rigidly attach the crank-arm F', which terminates farther from the center of the crank-wheel V. Said crank and crank-arm are connected directly with the plungers P and P', respectively, by pitmen R R. Both the crank F and crank-arm F' are in approximately the same vertical plane with the plungers, so as to obviate undue lateral strain, and the shaft N is in a lower plane than the plungers, to prevent interference of the plungers with the pitmen during their movement. The aforesaid arrangement of the crank-wheel V in relation to the plungers causes the cranks to produce a movement of the plungers which I have been unable to effect by any other disposition of said wheel or cranks.

The cranks F F' move in the direction indicated by arrows in Figs. 1 and 2 of the drawings, and during one half of the revolution of the shaft N the crank F is caused to push the primary plunger toward the head H in advance of the supplemental plunger P'. The ear of corn, having previously been deposited in the feed-trough T, is pushed along by the primary plunger and forced part way its length between the cutters $a\ a$. The supplemental plunger P', following the primary plunger with a longer thrust, forces the cob completely through between the cutters $a\ a$ and scrapers $a'\ a'$ and into the discharge-spout $s$. During the next half of the revolution of the shaft N the two plungers are successively retracted in the same order and brought to the end of the trough T farthest from the head H, and thus leaves the trough T empty and ready for the reception of another ear of corn. In forcing the ears of corn between the cutters and scrapers said cutters cut the kernels of corn from the cob, and subsequently the scrapers remove the germ and milky portions of the kernels from the cob.

The substance which is removed from the cob is delivered downward through the open bottom of the cap L, and the cob passes out through the port $m$ and into the spout $s$, which conducts them a proper distance from the machine. For depositing the ears of corn into the feed-trough T, I have devised the following improved automatic feed mechanism:

To the side of the frame A, at the trough T, I rigidly secure two arms, B B, which extend laterally and preferably inclined therefrom, as shown in Figs. 3 and 4 of the drawings. Between the two ends of said arms, and pivoted thereto, are two shafts, $r\ r$, which are parallel with the feed-trough T, and to said shafts are secured chain-wheels $v\ v$, around which are extended the endless feed belts or chains $v'\ v'$, preferably armed with fingers $x\ x$, arranged in rows across the chains at proper distances apart to receive an ear of corn between each two consecutive rows, as indicated by the dotted lines in Fig. 3 of the drawings.

The ends of the arms B B adjacent to the feed-trough T are formed with extensions B', on which is pivoted a gate, G, adapted to fall across the top of the chute or apron I, leading from the endless chains $v'\ v'$ to the feed-trough, to conduct to the latter the ears of corn carried on said chains. To the end of the shaft *r* nearest the gate G is rigidly attached a sprocket-wheel, S, and beneath this wheel is a counter-shaft, C, which is extended lengthwise of the frame and journaled in suitable bearings thereon. On the end of the counter-shaft, directly under the sprocket-wheel S, is loosely mounted another sprocket-wheel, S', and a drive-chain, E, connects said wheels. On the counter-shaft, at the side of the sprocket-wheel S', slides a clutch, M, connected with the shaft by a spline and groove in the usual and well-known manner. Said clutch is provided with two pins, 1 1, arranged in a diametric line at opposite sides of the counter-shaft, and the adjacent side of the hub of the sprocket-wheel S' is provided with two holes, 2 2, arranged correspondingly to the aforesaid pins. On the opposite end of the counter-shaft is firmly secured a bevel gear-wheel, 3, which meshes in a bevel gear-wheel, 4, secured to the driving-shaft N, as best seen in Fig. 5 of the drawings. By throwing the clutch M into engagement with the sprocket-wheel S' and revolving the shaft N, motion is transmitted to the feed-chains *v' v'*, which carry the ears of corn deposited thereon toward the gate G.

From the sprocket-wheel S project two cams, 5 5, which are in a diametric line at opposite sides of the axis of said wheel, as shown by dotted lines in Figs. 3 and 4 of the drawings. Said cams are so arranged that during the revolution of the wheel S they come in contact with a heel-extension, G', of the gate G, and thereby raise said gate, as represented in the aforesaid figures of the drawings. The movement of the gate is so timed with the movement of the plungers P P' as to cause the gate to open and allow an ear of corn to drop into the feed-trough T, while said plungers are retracted from the trough in front of the gate and immediately allow the gate to drop again into its closed position before the plungers advance toward the cutters, as represented in Fig. 1 of the drawings. A projection, 6, on the side of the arm-extension B' is encountered by the heel-extension of the gate during its descent and arrests the same before striking the apron I.

In order to maintain the movement of the gate G timed with the movements of the plungers, as aforesaid, I connect to the clutch M only two locking-pins 1 1 and the hub of the wheel S' with only two engaging-holes 2 2, arranged in such relative positions that when the clutch is thrown into engagement with the wheel S' the cams of the wheel S are in requisite position to actuate the gate G at the proper time.

Among the most salient features of my improvements are the following, to wit: All the cutter-carrying arms and scraper-carrying arms have no positive connection with each other, and each arm is thus adapted to operate independently of the others, and yet all of said cutter-carrying arms are operated by one and the same spring. By this arrangement the cutters are allowed to accommodate themselves more perfectly to the contour of the cob and operate on a crooked cob or on a cob that has corn only on one side as perfectly as on a straight cob or a cob that has the corn uniformly distributed.

By providing handles on the arms which carry the lowermost cutters I can swing said arms on their pivots so as to throw the cutters apart from each other, and thus allow the ear of corn to drop when necessary to prevent the choking of the machine. The other arms, which carry the upper cutters, remain undisturbed in their position. Besides these advantages, persons familiar with the use of this class of machines will also readily appreciate the advantage derived from the disposition of the cutter-carrying arms and scraper-carrying arms in relation to the discharge of the machine, whereby said arms are maintained dry and clean from the substances cut and scraped from the cobs.

Having described my invention, what I claim, and desire to secure by Letters Patent, is—

1. In combination with the main supporting-frame and the two plungers P' P, arranged one within the other, the crank-wheel V, arranged with its axis below the plane of the plungers, and having affixed to it the crank F and the crank-arm F', extended from said crank and both in approximately the same vertical plane with the two plungers, and pitmen connecting said crank and crank-arm directly with the plungers, substantially as described and shown.

2. In combination with the head H, the cutter-carrying arms D D D D, disconnected from each other to operate independently and by one and the same spring, and handles *h h*, attached to the arms which carry the lowermost cutters, substantially as described and shown.

3. In combination with the stationary head H, the cutter-carrying arms D D D D and scraper-carrying arms D' D' D' D', all extending upward from the cutters and scrapers and pivoted to the upper portion of the aforesaid head, substantially as described, whereby the said arms are held completely out of the passage of the corn and moisture in the process of cutting and scraping the same from the cob, as set forth.

4. In combination with the head H, the cutter-carrying arms D D D D, pivoted to said head and all actuated by one and the same spring, and each arm acting independently of the others, thereby adapting the cutters to operate with equal efficiency on crooked cobs and on cobs having corn only on one side as on straight and perfect ears of corn, substantially as set forth.

5. In combination with the head H, provided with the upper extension, H', and cutters *a a a a*, the cutter-carrying arms D D D D, extending upward from the cutters and pivoted to the upper part of said head, and terminating at points around a common center on the extension H', lugs *b b*, projecting from said extension, set-screws *e e*, connected to said lugs and bearing on the aforesaid arms, and the elastic band *c*, connected with said ends of the arms to normally hold the same on the aforesaid set screws, substantially as set forth.

6. In combination with the head H, arms D D, pivoted to the front of said head, and cutters connected to said arms, the bearings *l l*, projecting from the head H back of the arms D D, substantially as and for the purpose set forth.

7. In combination with the frame, cutters, feed-trough, plungers, and driving-shaft for operating said plungers, shafts arranged parallel with the feed-trough, chain-wheels on said shafts, endless feed-chains on said wheels, a movable gate between the feed-chains and feed-trough, a sprocket-wheel on one of the chain-wheel shafts, cams on the sprocket-wheel adapted to engage and raise the gate, a counter-shaft, a sprocket-wheel on one end of said counter-shaft, a drive-chain connecting the two sprocket-wheels, and engaging gears respectively on the opposite end of the counter shaft and on the aforesaid driving-shaft, substantially as shown.

In testimony whereof I have hereunto signed my name and affixed my seal, in the presence of two attesting witnesses, at Syracuse, in the county of Onondaga, in the State of New York, this 12th day of May, 1887.

G. LEWIS MERRILL. [L. S.]

Witnesses:
H. P. DENISON,
C. BENDIXON.